United States Patent
Kamijo et al.

(10) Patent No.: US 10,002,718 B2
(45) Date of Patent: Jun. 19, 2018

(54) LITHIUM ION CAPACITOR

(71) Applicant: Asahi Kasei Kabushiki Kaisha, Tokyo (JP)

(72) Inventors: Takeshi Kamijo, Tokyo (JP); Nobuhiro Okada, Tokyo (JP); Yuima Kimura, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 46 days.

(21) Appl. No.: 15/037,100

(22) PCT Filed: Nov. 28, 2014

(86) PCT No.: PCT/JP2014/081587
§ 371 (c)(1),
(2) Date: May 17, 2016

(87) PCT Pub. No.: WO2015/080253
PCT Pub. Date: Jun. 4, 2015

(65) Prior Publication Data
US 2016/0300666 A1    Oct. 13, 2016

(30) Foreign Application Priority Data

Nov. 29, 2013   (JP) ............................... 2013-248130

(51) Int. Cl.
*H01G 11/34*   (2013.01)
*H01G 11/06*   (2013.01)
(Continued)

(52) U.S. Cl.
CPC ............ *H01G 11/34* (2013.01); *H01G 11/06* (2013.01); *H01G 11/24* (2013.01); *H01G 11/26* (2013.01);
(Continued)

(58) Field of Classification Search
CPC ........ H01G 11/34; H01G 11/06; H01G 11/24; H01G 11/26; H01G 11/42; H01G 11/50;
(Continued)

(56) References Cited

U.S. PATENT DOCUMENTS

2004/0023118 A1   2/2004  Kinoshita et al.
2008/0139742 A1   6/2008  Kamakura et al.
(Continued)

FOREIGN PATENT DOCUMENTS

EP    1975951 A1   10/2008
EP    2214236 A1    8/2010
(Continued)

OTHER PUBLICATIONS

International Search Report issued in corresponding International Patent Application No. PCT/JP2014/081587 dated Feb. 17, 2015.
(Continued)

*Primary Examiner* — Dion R Ferguson
(74) *Attorney, Agent, or Firm* — Morgan, Lewis & Bockius LLP

(57) ABSTRACT

This lithium ion capacitor results from housing an electrode laminate body, which comprises a positive electrode, a negative electrode, and a separator, and a non-aqueous electrolyte, which contains a lithium-ion-containing electrolyte, in an external body, wherein the negative electrode has a negative electrode current collector and a negative electrode active material layer containing a negative electrode active material that can occlude and release lithium ions on one or both surfaces of the negative electrode current collector, and the following (i) to (iii) are all satisfied: (i) the negative electrode active material is a carbon composite material containing carbon black and a carbonaceous material; (ii) the negative electrode is doped with lithium ion at between 1,050 mAh/g and 2,500 mAh/g, inclusive, per unit
(Continued)

mass of the negative electrode active material; and (iii) the thickness of the negative electrode active material layer is between 10 μm and 60 μm, inclusive, per side.

16 Claims, 2 Drawing Sheets

(51) Int. Cl.
*H01G 11/24* (2013.01)
*H01G 11/26* (2013.01)
*H01G 11/42* (2013.01)
*H01G 11/50* (2013.01)
*H01G 11/62* (2013.01)
*H01G 11/66* (2013.01)

(52) U.S. Cl.
CPC ............ *H01G 11/42* (2013.01); *H01G 11/50* (2013.01); *H01G 11/62* (2013.01); *H01G 11/66* (2013.01); *Y02E 60/13* (2013.01); *Y02T 10/7022* (2013.01)

(58) Field of Classification Search
CPC ........ H01G 11/62; H01G 11/66; Y02E 60/13; Y02T 10/7022
See application file for complete search history.

(56) References Cited

U.S. PATENT DOCUMENTS

| 2013/0309577 | A1* | 11/2013 | Hayashi | H01G 9/048 429/231.8 |
|---|---|---|---|---|
| 2015/0115206 | A1* | 4/2015 | Fujii | H01M 4/134 252/506 |
| 2015/0371788 | A1* | 12/2015 | Okada | H01G 11/24 361/502 |
| 2016/0300667 | A1* | 10/2016 | Okada | H01G 11/06 |
| 2017/0207459 | A1* | 7/2017 | Okada | H01M 4/587 |

FOREIGN PATENT DOCUMENTS

| JP | H08-107048 A | 4/1996 |
|---|---|---|
| JP | 2001-229926 A | 8/2001 |
| JP | 2003-346801 A | 12/2003 |
| JP | 2003-346802 A | 12/2003 |
| JP | 2005-183632 A | 7/2005 |
| JP | 2008-150270 A | 7/2008 |
| JP | 2008-160068 A | 7/2008 |
| JP | 2009-224391 A | 10/2009 |
| JP | 2010-135648 A | 6/2010 |
| JP | 2010-205827 A | 9/2010 |
| JP | 2010-267875 A | 11/2010 |
| JP | 2011-204903 A | 10/2011 |
| JP | 2013-089625 A | 5/2013 |
| JP | 2013-219152 A | 10/2013 |
| JP | 2013-258422 A | 12/2013 |
| WO | 2002-041420 A1 | 5/2002 |

OTHER PUBLICATIONS

International Preliminary Report on Patentability and Written Opinion issued in corresponding International Patent Application No. PCT/JP2014/081587 dated Jun. 9, 2016.
Supplementary European Search Report issued in corresponding European Patent Application No. 14866119.2 dated Dec. 20, 2016.

* cited by examiner (a)

(b)

LITHIUM ION CAPACITOR

TECHNICAL FIELD

The present invention relates to a lithium ion capacitor.

BACKGROUND ART

In recent years, with an aim toward effective utilization of energy for greater environmental conservation and reduced usage of resources, a great deal of attention is being directed to electric power smoothing systems for wind power generation or overnight charging electric power storage systems, household dispersed power storage systems based on photovoltaic power generation technology, and power storage systems for electric vehicles.

The number one requirement for cells used in such power storage systems is high energy density. The development of lithium ion batteries is advancing at a rapid pace, as an effective strategy for cells with high energy density that can meet this requirement.

The second requirement is a high output characteristic. For example, in a combination of a high efficiency engine and a power storage system (such as in a hybrid electric vehicle), or a combination of a fuel cell and a power storage system (such as in a fuel cell electric vehicle), a high output discharge characteristic is required for the power storage system during acceleration.

Electrical double layer capacitors are currently under development as high output power storage devices.

Electrical double layer capacitors that employ active carbon in the electrodes have output characteristics of about 0.5 to 1 kW/L. Such electrical double layer capacitors have high durability (especially cycle characteristics and high-temperature storage characteristics), and have been considered optimal devices for fields requiring the high output mentioned above. However, their energy densities are no more than about 1 to 5 Wh/L. Even higher energy density is therefore necessary.

On the other hand, nickel hydrogen cells employed in current hybrid electric vehicles exhibit high output equivalent to electrical double layer capacitors, and have energy densities of about 160 Wh/L. Still, research is being actively pursued toward further increasing their energy density and output, and increasing their durability (especially stability at high temperatures).

Research is also advancing toward increased outputs for lithium ion batteries as well. For example, lithium ion batteries are being developed that yield high output exceeding 3 kW/L at 50% depth of discharge (a value representing the state of the percentage of discharge of the discharge capacity of a power storage element). However, the energy density is 100 Wh/L or less, and the design is such that high energy density, as the major feature of a lithium ion battery, is reduced. The durability (especially cycle characteristic and high-temperature storage characteristic) is inferior to that of an electrical double layer capacitor. In order to provide practical durability, therefore, they can only be used with a depth of discharge in a narrower range than 0 to 100%. Because the usable capacity is even lower, research is actively being pursued toward further increasing durability.

There is strong demand for implementation of power storage elements exhibiting high energy density, high output characteristics and durability, as mentioned above, but the aforementioned existing power storage elements have their advantages and disadvantages. New power storage elements are therefore desired that can meet these technical requirements. Power storage elements known as lithium ion capacitors are being actively developed in recent years as promising candidates.

The energy of a capacitor is represented as $\frac{1}{2} \cdot C \cdot V^2$ (where C is electrostatic capacity and V is voltage). A lithium ion capacitor is a type of power storage element that uses a non-aqueous electrolyte containing a lithium salt (non-aqueous lithium-type power storage element).

It is a power storage element that carries out charge-discharge by:

non-Faraday reaction by adsorption/desorption of anion similar to an electrical double layer capacitor at about 3 V or greater, at the positive electrode, and Faraday reaction by occlusion/release of lithium ion similar to a lithium ion battery, at the negative electrode.

An electrical double layer capacitor in which charge-discharge is accomplished by non-Faraday reaction at both the positive electrode and negative electrode has excellent input/output characteristics (it can perform charge-discharge of high current in a short period of time), but has low energy density. In contrast, a secondary battery in which charge-discharge is accomplished by Faraday reaction at both the positive electrode and negative electrode has excellent energy density but poor input/output characteristics. A lithium ion capacitor is a power storage element that aims to achieve both excellent input/output characteristics and high energy density by accomplishing charge-discharge by non-Faraday reaction at the positive electrode and Faraday reaction at the negative electrode.

The following, for example, have been proposed as lithium ion capacitors.

PTL 1 proposes a power storage element employing active carbon as the positive electrode active material, and as the negative electrode active material, a carbonaceous material obtained by occluding lithium by a chemical process or electrochemical process in a carbon material capable of occluding and withdrawing lithium in an ionized state. In that patent document, the carbon materials mentioned are natural graphite, artificial graphite, graphitized mesophase carbon microspheres, graphitized mesophase carbon fibers, graphite whiskers, graphitized carbon fibers, thermal decomposition products of furfuryl alcohol resin or novolac resin, and thermal decomposition products of polycyclic hydrocarbon condensation polymer compounds such as pitch coke. The procedure of occluding lithium in the carbon material beforehand will hereunder be referred to as "pre-doping". This term will distinguish the procedure from "doping" in which lithium ion is occluded into the negative electrode during charge, and "undoping" in which it is released during discharge.

PTLs 2 to 6 each propose electrodes and power storage element using active carbon as the positive electrode active material, and using as the negative electrode active material a composite porous material with a carbonaceous material covering the surface of active carbon, where the negative electrode active material has been pre-doped with lithium.

The lithium ion capacitors using these negative electrode active materials have low internal resistance compared to lithium ion capacitors using other materials such as graphite for the negative electrode active material, and therefore high output characteristics are obtained.

PTL 7 discloses, as a negative electrode active material for a lithium ion secondary battery that can exhibit high output characteristics and high energy density, a composite carbon material comprising carbon black and a carbonaceous material. In the Examples in PTLs 8 and 9 it is explained that such composite carbon materials have specific weight-average meso/macropore specific surface areas and can exhibit high input/output characteristics when the composite carbon materials are used as negative electrode active materials for lithium ion capacitors.

Lithium ion capacitors with even more improved output characteristics and increased energy density are desired. One method for increasing the energy density is to lower the thickness of the negative electrode active material layer to reduce the cell volume, while maintaining the same energy. As the thickness of the negative electrode active material layer is lowered, however, the mass of the negative electrode active material per unit area of the negative electrode is reduced, and it is therefore difficult to maintain the same energy while also improving the output characteristic.

CITATION LIST

Patent Literature

[PTL 1] Japanese Unexamined Patent Publication HEI No. 8-107048
[PTL 2] Japanese Unexamined Patent Publication No. 2001-229926
[PTL 3] International Patent Publication No. WO2002/041420
[PTL 4] Japanese Unexamined Patent Publication No. 2003-346801
[PTL 5] Japanese Unexamined Patent Publication No. 2003-346802
[PTL 6] Japanese Unexamined Patent Publication No. 2010-267875
[PTL 7] Japanese Unexamined Patent Publication No. 2008-150270
[PTL 8] Japanese Unexamined Patent Publication No. 2010-135648
[PTL 9] Japanese Unexamined Patent Publication No. 2013-258422

DISCLOSURE OF THE INVENTION

Problems to be Solved by the Invention

The Examples of PTL 7 disclose the aforementioned composite carbon material having a specific surface area smaller than 100 $m^2/g$, as calculated by the BET method (hereunder referred to as "BET specific surface area"). The Examples of PTL 8 disclose a lithium ion capacitor employing a composite carbon material, that presumably has a BET specific surface area of smaller than 100 $m^2/g$ as the negative electrode active material, from the viewpoint of the desirable weight-average meso/macropore specific surface area for a negative electrode exhibiting high input/output characteristics. The Examples of PTL 9 mention the weight-average meso/macropore specific surface area of composite carbon materials, but do not mention the BET specific surface area.

The present inventors have found that when a composite carbon material having a BET specific surface area of smaller than 100 $m^2/g$ is used as the negative electrode active material, it has not been possible to obtain a lithium ion capacitor having both a high output characteristic and high energy density, when the thickness of the negative electrode active material layer is reduced. Presumably this is because with a composite carbon material having a small BET specific surface area, it is not possible to sufficiently increase the lithium ion pre-doping amount per unit mass of the composite carbon material.

In light of this situation, it is an object of the present invention to provide a lithium ion capacitor exhibiting both a high output characteristic and high energy density, even when the thickness of the negative electrode active material layer has been reduced.

Means for Solving the Problems

The present inventors have conducted much diligent experimentation with the aim of solving the problems described above. As a result, this invention has been completed upon finding that, by using a composite carbon material with a BET specific surface area of 100 $m^2/g$ or greater as the negative electrode active material and adjusting the lithium ion pre-doping amount per unit mass of the composite carbon material, it is possible to obtain a lithium ion capacitor exhibiting both a high output characteristic and high energy density even when the negative electrode active material layer has been reduced in thickness.

Specifically, the present invention provides the following.

[1] A lithium ion capacitor comprising: an electrode laminate body comprising a positive electrode, a negative electrode and a separator; a non-aqueous electrolyte solution including a lithium ion-containing electrolyte; and an external body, wherein the electrode laminate body and the non-aqueous electrolyte solution is housed in the external body, wherein the negative electrode has: a negative electrode current collector; and a negative electrode active material layer that includes a negative electrode active material that can occlude and release lithium ions, on one or both sides of the negative electrode current collector, and wherein all of the following (i) to (iii) are satisfied:

(i) the negative electrode active material is a composite carbon material containing carbon black and a carbonaceous material, (ii) the negative electrode is doped with lithium ion at between 1,050 mAh/g and 2,500 mAh/g, inclusive, per unit mass of the negative electrode active material, and (iii) the thickness of the negative electrode active material layer is between 10 µm and 60 µm, inclusive, per side.

[2] The lithium ion capacitor according to [1], wherein the thickness of the negative electrode active material layer is between 10 µm and 40 µm, inclusive, per side.

[3] The lithium ion capacitor according to [1] or [2], wherein the electrode peel strength of the negative electrode is 0.20 N/cm or greater.

[4] The lithium ion capacitor according to [1] or [2], wherein the mean particle size (D50) of the composite carbon material is between 5 µm and 20 µm, inclusive.

[5] The lithium ion capacitor according to any one of [1], [2] and [4], wherein the specific surface area of the composite carbon material as calculated by the BET method is between 100 $m^2/g$ and 350 $m^2/g$, inclusive.

[6] The lithium ion capacitor according to any one of [1] to [5], wherein the negative electrode has an initial charge capacity of between 700 mAh/g and 1,600 mAh/g, inclusive, per unit mass of the negative electrode active material, when lithium metal is used as the counter electrode to form a lithium ion capacitor, and when constant-current charge has been conducted with a current value of 0.5 $mA/cm^2$ to a voltage value of 0.01 V, and then constant voltage charge is conducted until the current value reaches 0.01 $mA/cm^2$, at a measuring temperature of 25° C.

[7] The lithium ion capacitor according to any one of [1] to [6], wherein the composite carbon material is produced by baking or graphitizing a kneaded mixture of 100 parts by mass of carbon black and between 30 parts by mass and 200 parts by mass, inclusive of a precursor of the carbonaceous material.

[8] The lithium ion capacitor according to any one of [1] to [7], wherein the composite carbon material is produced by:

baking or graphitizing a kneaded mixture at 800° C. to 3,200° C., wherein the kneaded mixture is obtained by kneading:

the carbon black having a mean particle size of 12 to 300 nm as observed under an electron microscope, and a specific surface area of 200 to 1,500 m$^2$/g as determined by the BET method, and a precursor of the carbonaceous material; and pulverizing baked or graphitized the mixture to a mean particle size (D50) of 1 to 20 μm.

[9] The lithium ion capacitor according to any one of [1] to [8], wherein the positive electrode has:

a positive electrode current collector and a positive electrode active material layer including a positive electrode active material on one or both sides of the positive electrode current collector, and the positive electrode active material is active carbon satisfying the inequalities 0.3<V1≤0.8 and 0.5 V2≤1.0, where V1 (cc/g) is the mesopore volume due to pores with diameters of between 20 angstrom and 500 angstrom, inclusive, as calculated by the BJH method, and V2 (cc/g) is the micropore volume due to pores with diameters of smaller than 20 angstrom as calculated by the MP method, and having a specific surface area of between 1,500 m$^2$/g and 3,000 m$^2$/g, inclusive, as measured by the BET method.

[10] The lithium ion capacitor according to any one of [1] to [8], wherein the positive electrode has:

a positive electrode current collector and a positive electrode active material layer including a positive electrode active material on one or both sides of the positive electrode current collector, and the positive electrode active material is active carbon satisfying the inequalities 0.8<V1≤2.5 and 0.8<V2≤3.0, where V1 (cc/g) is the mesopore volume due to pores with diameters of between 20 angstrom and 500 angstrom, inclusive, as calculated by the BJH method, and V2 (cc/g) is the micropore volume due to pores with diameters of smaller than 20 angstrom as calculated by the MP method, and having a specific surface area of between 3,000 m$^2$/g and 4,000 m$^2$/g, inclusive, as measured by the BET method.

Effect of the Invention

The lithium ion capacitor of the invention has both a high output characteristic and high energy density, and exhibits high high-rate cycle durability.

MODE FOR CARRYING OUT THE INVENTION

Figure 1:
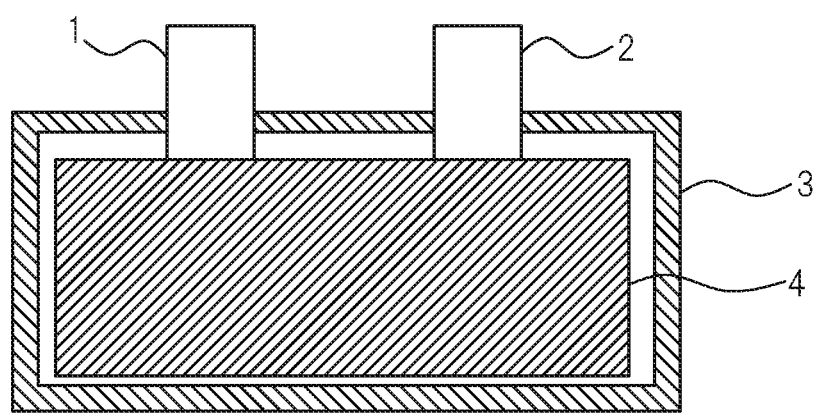
FIG. 1(a) is a cross-sectional schematic drawing showing one mode of the power storage element of the invention, in the planar direction.
FIG. 1(b) is a cross-sectional schematic drawing showing one mode of the power storage element of the invention, in the thickness direction.
Figure 1:
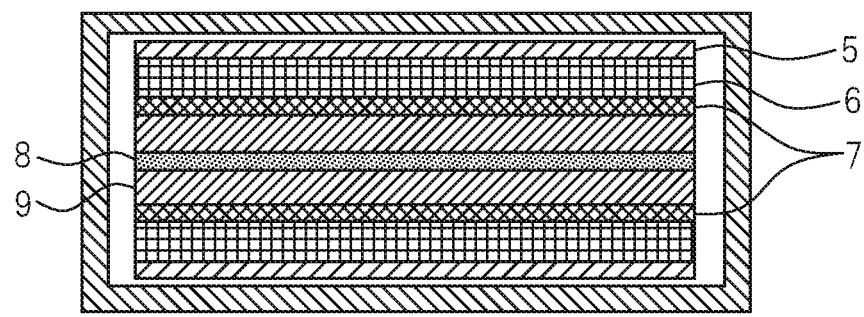

Embodiments of the invention will now be explained in detail.

The lithium ion capacitor of the invention comprises:

an electrode laminate body comprising a positive electrode, a negative electrode and a separator;

a non-aqueous electrolyte solution including a lithium ion-containing electrolyte; and an external body, wherein the electrode laminate body and the non-aqueous electrolyte solution are housed in the external body.

<1. Negative Electrode>

The negative electrode for the lithium ion capacitor of the invention has a negative electrode active material layer formed on a negative electrode current collector.

Preferably, the negative electrode has an initial charge capacity of between 700 mAh/g and 1,600 mAh/g, inclusive, per unit mass of the negative electrode active material, when lithium metal is used as the counter electrode to form a lithium ion capacitor, and when constant-current charge has been conducted with a current value of 0.5 mA/cm$^2$ to a voltage value of 0.01 V, and then constant voltage charge is conducted until the current value reaches 0.01 mA/cm$^2$, at a measuring temperature of 25° C. The value is more preferably between 700 mAh/g and 1,500 mAh/g, inclusive, and even more preferably between 740 mAh/g and 1,450 mAh/g, inclusive. If the initial charge capacity is 700 mAh/g or greater, the lithium ion pre-doping amount will be sufficiently large, thus allowing the negative electrode active material layer to be reduced in thickness and allowing a high output characteristic to be obtained when the negative electrode active material layer is reduced in thickness. If the initial charge capacity is 1,600 mAh/g or lower, there will be minimal swelling or contraction of the negative electrode active material, thus the strength of the negative electrode will be maintained.

<1.1. Negative Electrode Active Material>

The negative electrode is obtained by using a composite carbon material containing carbon black and a carbonaceous material as the negative electrode active material. The BET specific surface area of the negative electrode active material is preferably 100 m$^2$/g or greater, and more preferably between 100 m$^2$/g and 350 m$^2$/g, inclusive. The BET specific surface area is even more preferably between 150 m$^2$/g and 300 m$^2$/g, inclusive, and most preferably between 180 m$^2$/g and 240 m$^2$/g, inclusive.

A positive correlation exists between the BET specific surface area of a negative electrode active material and the initial charge capacity and allowable pre-doping amount for lithium ions per unit mass of the negative electrode active material. This is thought to be because with increasing BET specific surface area, the density of lithium ion occlusion sites is higher at locations other than between the carbon mesh surface layers, such as at the edge surfaces and defect sites of the carbon mesh surface layers. Therefore if the BET specific surface area is 100 m$^2$/g or greater, the pre-doping amount can be sufficiently increased thereby allowing the thickness of the negative electrode active material layer to be reduced. Furthermore, even if the negative electrode active material layer has been reduced in thickness, a high output characteristic can be exhibited since a sufficiently large number of sites are present where doping/undoping of lithium ion takes place (the reaction sites). If the BET specific surface area is not greater than 350 m$^2$/g, on the other hand, the negative electrode active material layer will have excellent coatability.

The composite carbon material is produced by baking or graphitizing a kneaded mixture obtained by kneading carbon black with a precursor that can yield a carbonaceous material, and then pulverizing baked or graphitized the mixture to a mean particle size (D50) of 1 to 20 µm.

The composite carbon material can be obtained by:
baking or graphitizing a kneaded mixture at 800° C. to 3,200° C., wherein the kneaded mixture is obtained by kneading:
carbon black having a mean particle size of 12 to 300 nm as observed under an electron microscope, and BET specific surface area of 200 to 1,500 m$^2$/g, and
a precursor of the carbonaceous material; and then
pulverizing baked or graphitized the mixture to a mean particle size (D50) of 1 to 20 µm.

The amount of carbonaceous material precursor used for production of the composite carbon material is preferably between 30 parts by mass and 200 parts by mass, inclusive, with respect to 100 parts by mass of the carbon black. It is more preferably between 30 parts by mass and 150 parts by mass, inclusive. If the proportion is 30 parts by mass or greater, a high output characteristic will be achieved by the effect of compositing. If the proportion is 200 parts by mass or lower, on the other hand, it will be possible to maintain a suitable BET specific surface area and increase the lithium ion pre-doping amount. The negative electrode active material used may be of a single type or a mixture of two or more different types.

The carbon black used as the starting material for the composite carbon material may be one of any of the commercially available grades so long as the obtained composite carbon material exhibits the desired properties.

As mentioned above, the mean particle size of the carbon black used as the starting material, as observed under an electron microscope, is preferably 12 to 300 nm. The method used for measuring the particle diameter of the carbon black is a method in which photographs are taken with an electron microscope in different visual fields at a magnification of several 10,000×, and the particle diameters of about 2,000 to 3,000 particles in the visual fields are measured using a fully automatic image processor (Carbon Black Handbook, 3rd Edition, (Tosho Shuppan, May 25, 1973) p. 4). For this embodiment, the carbon black used have a mean particle size of 12 to 300 nm, as determined with an electron microscope. Based on the Catalog No. for each commercially available grade, it is believed that virtually most of carbon blacks have particle diameters within this range.

The carbonaceous material precursor used may be petroleum or coal-based pitch, or a resin such as phenol resin, furan resin or divinylbenzene. These may be used as single types, or mixtures of two or more different types may be used. Among such precursors, the use of inexpensive pitch is preferred in terms of production cost.

The carbon black and the carbonaceous material precursor are kneaded using an appropriate kneading machine such as a heating kneader. After kneading, the mixture is baked or graphitized in a non-oxidizing atmosphere at 800° C. to 3,200° C. If the heat treatment temperature is below 800° C., functional groups of the particle surfaces will remain. In the obtained lithium ion capacitor, the residual functional groups react with Li ions and are therefore undesirable as they result in increased capacity loss and generation of an inflection point near 1 V in the discharge curve. If the heat treatment temperature exceeds 3,400° C., the graphitized particles will sublimate, and therefore baking or graphitizing at a temperature of 3,200° C. is the limit.

Next, the baked or graphitized product obtained in this manner is pulverized to a mean particle size (D50) of preferably 1 to 20 µm. The lower limit for the mean particle size (D50) is more preferably 5 µm or greater and even more preferably 7 µm or greater. The upper limit for the mean particle size (D50) is more preferably not greater than 20 µm and even more preferably not greater than 15 µm. If the mean particle size (D50) is 5 µm or greater, the electrode peel strength of the negative electrode will be sufficiently high when the composite carbon material is used as a negative electrode active material. This is conjectured to be because when the negative electrode active material, conductive filler and binder are dispersed in a solvent to prepare a slurry, and the negative electrode active material layer is coated and dried on a negative electrode current collector, the solid agglutination that occurs with evaporation of the solvent is reduced and cracking of the electrode can be minimized. Another known method for increasing the peel strength of the electrode involves change the type or amount of binder. However, when a composite carbon material having a BET specific surface area of 100 m$^2$/g or greater is used as the negative electrode active material, no significant increase can be confirmed in the electrode peel strength of the negative electrode by changing the type and amount of the binder. If the mean particle size (D50) is 20 µm or smaller, on the other hand, the coatability is excellent without scratching, when the negative electrode active material layer is coated on the negative electrode current collector in the manner described above.

The particle size of the particles after pulverizing is the value measured by laser diffraction.

After pulverizing, baking or graphitizing may be conducted again at 800 to 3,200° C. if necessary.

The composite carbon material as the negative electrode active material for the invention is an aggregate comprising a carbonaceous material binding to carbon black, and it is a porous carbon material having a specific pore structure, and a graphite material.

The pore structure of the composite carbon material can be known by an adsorption isotherm for adsorption/desorption of nitrogen gas.

In the adsorption isotherm for adsorption/desorption of nitrogen gas, the change in adsorption of nitrogen gas is low up to a relative pressure (P/P0) of the nitrogen gas of around 0.8, and drastically increases when it exceeds 0.8. For the composite carbon material of the invention, the adsorption of nitrogen gas at a nitrogen gas relative pressure (P/P0) of near 0.99 in the adsorption isotherm for adsorption/desorption of nitrogen gas is preferably 10 to 1,000 ml/g. This condition indicates that for the composite carbon material of the invention, the pore volume of micropores with pore diameters of 2 nm and smaller is not greater than 20% of the total pore volume.

The composite carbon material of the invention having the specific pore structure described above functions as a negative electrode active material that exhibits both a high output characteristic and high energy density. The starting materials for the composite carbon material are inexpensive carbon black and a carbonaceous material precursor (preferably pitch), and it can be obtained by the simple steps of baking or graphitizing of their kneaded mixture, followed by pulverizing. Selection of the grade of the carbon black and selection of its mixing ratio with the carbonaceous material precursor allows control over the pore structure as well.

<1.2. Other Components of Negative Electrode Active Material Layer>

If necessary, a conductive filler and binder, for example, may be added to the negative electrode active material layer in addition to the negative electrode active material.

The type of conductive filler is not particularly restricted, and examples include acetylene black, Ketjen black and vapor grown carbon fibers. The amount of conductive filler added is preferably 0 to 30 mass %, for example, with respect to the negative electrode active material.

The binder is not particularly restricted, and for example, PVdF (polyvinylidene fluoride), PTFE (polytetrafluoroethylene) or styrene-butadiene copolymer may be used. The amount of binder added is preferably in the range of 3 to 20 mass %, for example, with respect to the negative electrode active material.

<1.3. Formation of Negative Electrode>

The negative electrode for the lithium ion capacitor may be produced by a known electrode-forming method for lithium ion batteries or electrical double layer capacitors. For example, it can be obtained by dispersing the negative electrode active material, conductive filler and binder in a solvent to form a slurry, coating the slurry onto the negative electrode current collector and drying it, with pressing if necessary, to form a negative electrode active material layer. Alternatively, instead of using a solvent, there may be used a method in which the negative electrode active material, conductive filler and binder are mixed in a dry system and the mixture is pressed to form a negative electrode active material layer, and then a conductive adhesive is used for attachment of the negative electrode active material layer to the negative electrode current collector.

The negative electrode for a lithium ion capacitor may be having a negative electrode active material layer formed on only one side or on both sides of a current collector. Both before pre-doping and after pre-doping of the lithium ion, the thickness of the negative electrode active material layer is between 10 μm and 60 μm, inclusive, per side. The lower limit for the thickness of the negative electrode active material layer is preferably 15 μm or greater and more preferably 20 μm or greater. The upper limit for the thickness of the negative electrode active material layer is preferably not greater than 55 μm and more preferably not greater than 40 μm. If the thickness is 10 μm or greater, the coatability will be excellent without scratching during coating of the negative electrode active material layer. If the thickness is 60 μm or smaller, on the other hand, high energy density can be exhibited by reducing the cell volume. When the current collector has pores, the thickness of the negative electrode active material layer is the average value of the thickness per side at the sections of the current collector without pores. In this case, examples of such pores include through-hole sections of punched metal, and open hole sections of expanded metal or etching foil.

The bulk density of the negative electrode active material layer is preferably between 0.40 g/cm$^3$ and 1.2 g/cm$^3$, inclusive and more preferably between 0.70 g/cm$^3$ and 1.0 g/cm$^3$, inclusive. If the bulk density is 0.40 g/cm$^3$ or greater, sufficient strength can be obtained and sufficient conductivity can be exhibited between the active materials. If it is 1.2 g/cm$^3$ or lower, it is possible to ensure holes through which the ions can be sufficiently diffused in the active material layer.

The material of the negative electrode current collector may be used without any particular restrictions so long as it is a material that does not undergo deterioration such as elution or reaction after formation of the power storage element. Examples include copper, iron and stainless steel. The negative electrode current collector in a negative electrode for a lithium ion capacitor according to the invention is preferably copper. A metal foil may be used as the negative electrode current collector, and there may be used a structure which allows formation of an electrode in a gap in the metal. The metal foil may be a metal foil without through-holes, or it may be a metal foil having the through-holes of expanded metal, punched metal or etching foil.

The thickness of the negative electrode current collector is not particularly restricted so long as it allows the shape and strength of the negative electrode to be maintained, but 1 to 100 μm, for example, is preferred.

The electrode peel strength of the negative electrode of the invention is preferably 0.20 N/cm or greater and more preferably 0.25 N/cm or greater. The electrode peel strength of the negative electrode is preferably 0.20 N/cm or greater as this will help to prevent loss of the negative electrode active material from the electrode by swelling and contraction of the negative electrode that occur with doping and undoping of lithium ions, so that the cycle durability will be excellent.

The electrode peel strength, according to the present specification, is preferably the value for the negative electrode having a negative electrode active material layer formed on both sides of a negative electrode current collector with pores. Specifically, it is measured by the following method, as an example.

Figure 2:
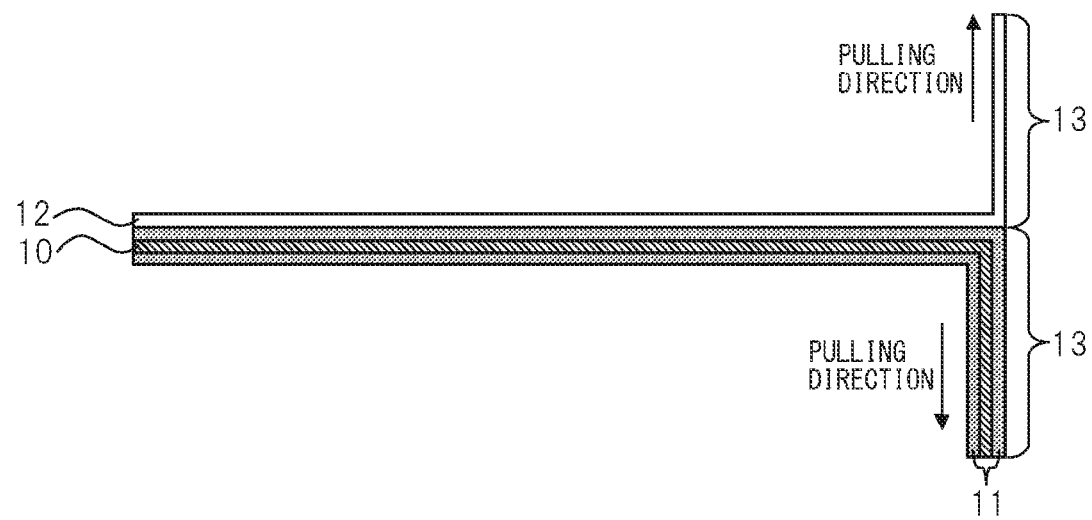
FIG. 2 is a schematic diagram showing the method used for the electrode peel strength test of the present specification.

The following explanation refers to FIG. 2.

A negative electrode active material layer (11) is formed by any of the methods described above, on both sides of a negative electrode current collector (10) that has pores, to fabricate a negative electrode. The obtained negative electrode is cut out to a rectangular shape of 25 mm width×250 mm length. Next, CT-24 CELLOTAPE by Nichiban Co., Ltd. is cut out to 24 mm width×250 mm length and a 24 mm width×200 mm length portion is pasted onto the surface of the negative electrode active material layer of the cut out negative electrode, to prepare a test piece. Of the obtained test piece, the non-bonded sections (13) of the negative electrode (10) and the CELLOTAPE (12) are anchored to a length of 25 mm each onto the clamps of a tensile tester, and the peel strength with T-peeling is measured according to JIS K 6854-3(1999), under the following conditions:

Measuring temperature: room temperature
Maximum load capacity of load cell: 5N
Peel angle: 180° C.
Peel rate: 50 mm/min
Peel distance (moving distance of clamps): 160 mm. The tensile tester used may be a commercially available device.

Of the peel strengths obtained by this method, the average peel strength between peel distances of 25 mm to 65 mm is recorded as the electrode peel strength for the invention.

<1.4. Pre-Doping of Lithium Ion into Negative Electrode Active Material>

Lithium ion is pre-doped into the negative electrode active material in the negative electrode active material layer. The pre-doping amount is between 1,050 mAh/g and 2,500 mAh/g, inclusive, per unit mass of the negative electrode active material. The pre-doping amount is preferably between 1,100 mAh/g and 2,200 mAh/g, inclusive.

Pre-doping lithium ion will lower the negative electrode potential, increasing the cell voltage when combined with the positive electrode and also increasing the utilizable capacity of the positive electrode. This will result in high capacity and high energy density. In a negative electrode for a lithium ion capacitor according to the invention, if the pre-doping amount is an amount exceeding 1,050 mAh/g, lithium ion will be sufficiently pre-doped even in the irreversible sites of the negative electrode active material that cannot be desorbed once lithium ion has been intercalated, and it will be possible to reduce the amount of negative electrode active material with respect to the desired amount of lithium, thereby allowing the negative electrode thickness to be reduced and resulting in a high output characteristic and high energy density. A large pre-doping amount will also lower the negative electrode potential and increase the energy density, but if the amount is not greater than 2,500 mAh/g there will be less risk of side-effects such as deposition of lithium metal.

The method used for pre-doping of the negative electrode for a lithium ion capacitor with lithium ion may be a known method. One example is a method of shaping the negative electrode active material into an electrode body, and then using the negative electrode as the working electrode and metal lithium as the counter electrode to fabricate an electrochemical cell in combination with a non-aqueous electrolyte, and electrochemically pre-doping it with lithium ion. It is also possible to contact bond a metal lithium foil onto the negative electrode body and place it in a non-aqueous electrolyte, for pre-doping of the negative electrode with lithium ion.

<1.5. Achieving Both High Output Characteristic and High Energy Density>

From the viewpoint of providing a negative electrode with both a high output characteristic and high energy density, preferably the negative electrode active material is a composite carbon material containing carbon black and a carbonaceous material, the BET specific surface area of the negative electrode active material is adjusted to between 100 $m^2/g$ and 350 $m^2/g$, inclusive, the pre-doping amount of lithium ion is adjusted to between 1,050 mAh/g and 2,500 mAh/g, inclusive, per unit mass of the negative electrode active material, and the thickness of the negative electrode active material layer is adjusted to between 10 μm and 60 μm, inclusive. More specifically, in order to improve the energy density [mAh/volume of negative electrode active material layer $(cm^3)$], preferably the thickness of the negative electrode active material layer is controlled to reduce the volume of the negative electrode, and the BET specific surface area of the negative electrode active material is preferably adjusted to a range to allow excellent coatability of the negative electrode and to allow the pre-doping amount of the lithium ion to be increased.

<2. Positive Electrode>

The positive electrode for the lithium ion capacitor of the invention has a positive electrode active material layer formed on a positive electrode current collector.

<2.1. Positive Electrode Active Material>

The positive electrode active material layer contains a positive electrode active material and a binder, and further contains a conductive filler if necessary. Active carbon is preferably used as the positive electrode active material.

There are no particular restrictions on the type of active carbon or its starting material, but preferably the pores of the active carbon are optimally controlled to obtain both high capacity (i.e. high energy density) and a high output characteristic (i.e. high power density). Active carbon 1 and active carbon 2 will now be described in order, as preferred positive electrode active materials.

<Active Carbon 1>

Active carbon 1 is preferably active carbon satisfying the inequalities 0.3<V1≤0.8 and 0.5 V2≤1.0, where V1 (cc/g) is the mesopore volume due to pores with diameters of between 20 angstrom and 500 angstrom, inclusive, as calculated by the BJH method, and V2 (cc/g) is the micropore volume due to pores with diameters of smaller than 20 angstrom as calculated by the MP method, and having a specific surface area of between 1,500 $m^2/g$ and 3,000 $m^2/g$, inclusive, as measured by the BET method.

The mesopore volume V1 is preferably a value larger than 0.3 cc/g, from the viewpoint of a greater output characteristic when the positive electrode material has been incorporated into a power storage element, and it is preferably not greater than 0.8 cc/g from the viewpoint of minimizing reduction in the capacity of the power storage element. The value of V1 is more preferably between 0.35 cc/g and 0.7 cc/g, inclusive, and even more preferably between 0.4 cc/g and 0.6 cc/g, inclusive.

The micropore volume V2 is preferably 0.5 cc/g or greater for a larger specific surface area of the active carbon and to increase the capacity, and it is preferably not greater than 1.0 cc/g to reduce the bulk of the active carbon, increase the density as an electrode, and to increase the capacity per unit volume. V2 is more preferably between 0.6 cc/g and 1.0 cc/g, inclusive, and even more preferably between 0.8 cc/g and 1.0 cc/g, inclusive.

The ratio (V1/V2) of the mesopore volume V1 with respect to the micropore volume V2 is preferably in the range of 0.3 V1/V2≤0.9. That is, V1/V2 is preferably 0.3 or greater from the viewpoint of increasing the ratio of the mesopore volume to the micropore volume to a degree allowing reduction in the output characteristic to be minimized while obtaining high capacity. V1/V2 is also preferably not greater than 0.9 from the viewpoint of increasing the ratio of the micropore volume to the mesopore volume to a degree allowing reduction in the capacity to be minimized while obtaining a high output characteristic. A more preferred range for V1/V2 is 0.4≤V1/V2≤0.7, and an even more preferred range for V1/V2 is 0.55≤V1/V2≤0.7.

The micropore volume and mesopore volume of the active carbon can be determined by the following methods, respectively. Specifically, a sample is vacuum dried at 500° C. for a day and a night, and then the adsorption/desorption isotherm is measured using nitrogen as the adsorbate. The isotherm at the desorption side is used for calculation of the micropore volume by the MP method and the mesopore volume by the BJH method. The MP method is a method in which the "t-plot method" (B. C. Lippens, J. H. de Boer, J. Catalysis, 4, 319(1965)) is utilized to determine micropore volume, micropore area and micropore distribution. The MP method is the method proposed by M. Mikhail, Brunauer and Bodor (R. S. Mikhail, S. Brunauer, E. E. Bodor, J. Colloid Interface Sci., 26, 45 (1968)). The BJH method is a method of calculation commonly used for analysis of mesopores, and it was advocated by Barrett, Joyner, Halenda et al. (E. P. Barrett, L. G. Joyner and P. Halenda, J. Amer. Chem. Soc., 73, 373(1951)).

The mean pore size of the active carbon 1 is preferably 17 angstrom or greater, more preferably 18 angstrom or greater and even more preferably 20 angstrom or greater, from the viewpoint of maximizing the output. From the viewpoint of maximizing the capacity, it is also preferably not greater than 25 angstrom. The "mean pore size", as used herein, is the value obtained by dividing the total pore volume per mass, as obtained by measuring the equilibrium adsorption volumes of nitrogen gas under different relative pressures at the temperature of liquid nitrogen, by the BET specific surface area.

The BET specific surface area of the active carbon 1 is preferably between 1,500 $m^2/g$ and 3,000 $m^2/g$, inclusive, and more preferably between 1,500 $m^2/g$ and 2,500 $m^2/g$, inclusive. If the BET specific surface area is 1,500 $m^2/g$ or greater, it will be easier to obtain satisfactory energy density, and if the BET specific surface area is 3,000 $m^2/g$ or lower, there will be no need to add large amounts of a binder to maintain the strength of the electrode, and therefore the performance per volume of the electrode will tend to be higher.

The active carbon 1 having such features can be obtained, for example, using the starting material and treatment method described below.

For this embodiment of the invention, the carbon source to be used as starting material for the active carbon is not particularly restricted. Examples that may be used include plant-based starting materials such as wood, wood dust, coconut shell, by-products of pulp production, bagasse and molasses; fossil-based starting materials such as peat, lignite, brown coal, bituminous coal, anthracite, petroleum distillation residue components, petroleum pitch, coke and coal tar; various synthetic resins such as phenol resin, vinyl chloride resin, vinyl acetate resin, melamine resin, urea resin, resorcinol resin, celluloid, epoxy resin, polyurethane resin, polyester resin and polyamide resin; synthetic rubbers such as polybutylene, polybutadiene and polychloroprene; and other synthetic wood or synthetic pulp materials, as well as carbides of the foregoing. Preferred among these starting materials are one or more types selected from among plant-based starting materials such as coconut shell and wood dust, as well as their carbides, with coconut shell carbide being especially preferred.

The system used for carbonization and activation of these starting materials to obtain the active carbon may be a known system such as, for example, a fixed bed system, moving bed system, fluidized bed system, slurry system or rotary kiln system.

An example of the carbonization method for these starting materials is a method in which an inert gas such as nitrogen, carbon dioxide, helium, argon, xenon, neon, carbon monoxide or exhaust gas, or a mixed gas composed mainly of such inert gases with other gases, is used for baking at a temperature of about 400 to 700° C. (preferably 450 to 600° C.), over a period of about 30 minutes to 10 hours.

The activation method for the carbide obtained by the carbonization method may be, for example, a gas activation method in which baking is accomplished using an activating gas such as water vapor, carbon dioxide or oxygen, or an alkali metal activation method in which heat treatment is carried out after mixture with an alkali metal compound. When a gas activation method is used, a method using water vapor or carbon dioxide as the activating gas is preferred. In this activation method, preferably the activating gas is supplied at a rate of 0.5 to 3.0 kg/h (preferably 0.7 to 2.0 kg/h) while the carbide is raised to 800 to 1,000° C. over a period of 3 to 12 hours (preferably 5 to 11 hours and even more preferably 6 to 10 hours), for activation.

The carbide may be subjected to a primary activation before activation treatment of the carbide. In the primary activation, usually the carbon material may be baked at a temperature of below 900° C. using an activating gas such as water vapor, carbon dioxide or oxygen, for example, for gas activation.

By appropriate combinations for the baking temperature and baking time for the carbonization method, and the activating gas supply rate and the temperature-elevating rate and maximum activation temperature in the activation method, it is possible to produce active carbon 1 having the features described above, that may be used for this embodiment of the invention.

The mean particle size of the active carbon 1 is preferably 1 to 20 μm. If the mean particle size is 1 μm or greater, the capacity per electrode volume will tend to be higher due to the higher density of the active material layer. A mean particle size of no larger than 20 μm, on the other hand, will tend to be more suitable for high-speed charge-discharge. The mean particle size is more preferably 2 to 15 μm and even more preferably 3 to 10 μm.

The term "mean particle size" as used herein refers to the particle diameter at the point where, when the particle size distribution is measured using a particle size distribution analyzer and a cumulative curve with 100% as the total volume is determined, the cumulative curve is at 50% (that is, the 50% diameter (median diameter)).

<Active Carbon 2>

Another preferred active carbon is active carbon 2, satisfying the inequalities $0.8<V1\leq2.5$ and $0.8<V2\leq3.0$, where V1 (cc/g) is the mesopore volume due to pores with diameters of between 20 angstrom and 500 angstrom, inclusive, as calculated by the BJH method, and V2 (cc/g) is the micropore volume due to pores with diameters of smaller than 20 angstrom as calculated by the MP method, and having a specific surface area of between 3,000 $m^2/g$ and 4,000 $m^2/g$, inclusive, as measured by the BET method.

The mesopore volume V1 is preferably a value larger than 0.8 cc/g, from the viewpoint of a greater output characteristic when the positive electrode material has been incorporated into a power storage element, and it is preferably not greater than 2.5 cc/g from the viewpoint of minimizing reduction in the capacity of the power storage element. The value of V1 is more preferably between 1.00 cc/g and 2.0 cc/g, inclusive, and even more preferably between 1.2 cc/g and 1.8 cc/g, inclusive.

The micropore volume V2 is preferably greater than 0.8 cc/g for a larger specific surface area of the active carbon and to increase the capacity, and it is preferably not greater than 3.0 cc/g to increase the density as an electrode, and to increase the capacity per unit volume. V2 is more preferably greater than 1.0 cc/g and not greater than 2.5 cc/g, and even more preferably between 1.5 cc/g and 2.5 cc/g, inclusive.

The active carbon 2 having such features can be obtained, for example, using the starting material and treatment method described below.

For this embodiment of the invention, the carbon source to be used as starting material for the active carbon is not particularly restricted. Examples include plant-based starting materials such as wood, wood dust and coconut shell; fossil-based starting materials such as petroleum pitch and coke; and various synthetic resins such as phenol resin, furan resin, vinyl chloride resin, vinyl acetate resin, melamine resin, urea resin and resorcinol resin. Of these starting materials, phenol resin and furan resin are especially preferred, being suitable for fabrication of active carbon 2 with a high specific surface area.

The system used for carbonization and activation of these starting materials to obtain the active carbon 2 may be a known system such as, for example, a fixed bed system, moving bed system, fluidized bed system, slurry system or rotary kiln system. The carbonization method for these starting materials is a method in which an inert gas such as nitrogen, carbon dioxide, helium, argon, xenon, neon, carbon monoxide or exhaust gas, or a mixed gas composed mainly of such inert gases with other gases, is used for baking at a temperature of about 400 to 700° C. (preferably 450 to 600° C.), over a period of about 30 minutes to 10 hours.

The activation method for the carbide obtained by the carbonization method may be, for example, a gas activation method in which baking is accomplished using an activating gas such as water vapor, carbon dioxide or oxygen, or an alkali metal activation method in which heat treatment is carried out after mixture with an alkali metal compound. An alkali metal activation method is preferred to prepare active carbon 2 with a high specific surface area. In this activation method, preferably a carbide and an alkali metal compound such as KOH or NaOH are mixed so that the mass ratio is 1:1 (the amount of the alkali metal compound being equal to or greater than the amount of the carbide), after which heat treatment is carried out in a range of 600 to 900° C. for 0.5 to 5 hours under an inert gas atmosphere, and then the alkali metal compound is subjected to cleaning removal with an acid or water, and drying is performed.

In order to increase the micropore volume and not increase the mesopore volume, the amount of carbide is increased during activation, and mixed with KOH. In order to increase both pore volumes, a larger amount of KOH may be used. In order to increase mainly the mesopore volume, steam-activation may also be carried out after alkaline activation treatment.

The mean particle size of the active carbon 1 is preferably 1 to 30 μm. It is more preferably 2 to 20 μm. It may also be a mixture of two different active carbons with different mean particle sizes. The mean particle size is the value determined by the same method as for the active carbon described above.

The positive electrode active material may include materials other than the active carbons 1 and 2 (for example, activated carbon without the specified V1 and/or V2 values, or complex oxides of lithium and transition metals). In such cases, the contents of the active carbon 1 and active carbon 2 are preferably greater than 50 mass % with respect to the total positive electrode active material. The values are more preferably 70 mass % or greater, even more preferably 90 mass % or greater and most preferably 100 mass %.

<2.2. Other Components of Positive Electrode Active Material Layer>

If necessary, a conductive filler and binder, for example, may be added to the positive electrode active material layer in addition to the positive electrode active material.

As the binder there may be used, for example, polyvinylidene fluoride (PVdF), polytetrafluoroethylene (PTFE), fluorine rubber or an acrylic copolymer. The mixing amount of the binder in the positive electrode active material layer is in the range of preferably 3 to 20 mass % and more preferably 5 to 15 mass %, with respect to the positive electrode active material.

If necessary, a conductive filler comprising a conductive carbonaceous material with higher conductivity than the positive electrode active material may be mixed with the positive electrode active material layer. Preferred examples of such conductive fillers include Ketjen black, acetylene black, vapor grown carbon fibers, graphite, and mixtures thereof. The mixing amount of the conductive filler in the positive electrode active material layer is in the range of preferably 0 to 20 mass % and more preferably 1 to 15 mass %, with respect to the positive electrode active material. While it is preferred to mix a conductive filler, from the viewpoint of high input, mixture in an amount exceeding 20 mass % will result in a lower content of the positive electrode active material in the positive electrode active material layer, and thus lower energy density per cell volume, and therefore is not preferred.

<2.3. Formation of Positive Electrode>

The positive electrode for the lithium ion capacitor of the invention may be produced using a known electrode-forming method for lithium ion batteries or electrical double layer capacitors. For example, it can be obtained by preparing a slurry that has the positive electrode active material, conductive filler and binder dispersed in a solvent, coating the slurry onto one or both sides of the positive electrode current collector and drying it, with pressing if necessary, to form a positive electrode active material layer. Alternatively, instead of using a solvent, there may be used a method in which the positive electrode active material, conductive filler and binder are mixed in a dry system and the mixture is pressed to form a positive electrode active material layer, and then the conductive adhesive is used for attachment of the positive electrode active material layer to one or both sides of the positive electrode current collector.

As examples for the coating method there may be mentioned bar coating methods, transfer roll methods, T-die methods and screen printing methods, and the coating method may be appropriately selected according to the physical properties of the slurry and the coating thickness. Examples of press working methods include methods of pressing while heating using a roll set to a prescribed temperature, and methods of pressing without heating.

The thickness of the positive electrode active material layer is preferably about 30 μm to 200 μm per side of the current collector. The thickness of the positive electrode active material layer per side is more preferably between 45 μm and 100 μm, inclusive, and even more preferably between 50 μm and 85 μm, inclusive. If the thickness is 30 μm or greater, sufficient charge-discharge capacity can be exhibited. If the thickness is 200 μm or smaller, on the other hand, the ion diffusion resistance in the electrode can be reduced. It will thus be possible to obtain an adequate output characteristic and to increase the energy density by reducing the cell volume. When the current collector has pores, the thickness of the positive electrode active material layer is the average value of the thickness per side at the sections of the current collector without pores. In this case, examples of such pores include through-hole sections of punched metal and open hole sections of expanded metal.

The material of the positive electrode current collector is not particularly restricted so long as it is a material that does not undergo deterioration such as elution or reaction after it has been formed into a power storage element. Aluminum may be mentioned as an example. The form of the positive electrode current collector may be a structure which is a metal foil, or one that allows formation of an electrode in the gap of a metal. The metal foil may be a metal foil without through-holes, or it may be a metal foil having through-holes such as expanded metal, punched metal or etching foil.

The thickness of the positive electrode current collector is not particularly restricted so long as the shape and strength of the positive electrode can be adequately maintained. For example, a thickness of 1 to 100 μm is preferred.

The bulk density of the positive electrode active material layer is preferably 0.40 g/cm$^3$ or greater, and more preferably in the range of between 0.45 g/cm$^3$ and 0.70 g/cm$^3$, inclusive. If the bulk density is 0.40 g/cm$^3$ or greater, it will be possible to increase the capacity per electrode volume and to accomplish downsizing of the power storage element. If the bulk density is 0.70 g/cm$^3$ or lower, diffusion of the electrolyte in the voids of the positive electrode active material layer will be adequate, and the charge-discharge characteristic under high current will be higher.

A preferred ratio for the negative electrode thickness and the positive electrode thickness according to the invention is negative electrode thickness/positive electrode thickness=0.25 to 4.0, more preferably 1 to 3 and even more preferably 1.5 to 2.5. The working of this power storage element is based on Faraday reaction at the negative electrode and non-Faraday reaction at the positive electrode, and the system is such that the electrostatic capacity of the negative electrode is sufficiently larger than the electrostatic capacity of the positive electrode. Therefore if the aforementioned ratio is 0.25 or greater, the electrostatic capacity of the negative electrode will be able to provide the amount of the electrostatic capacity of the positive electrode, and the capacity balance of the electrode can be maintained. Due to the working described above, since the energy capacity of the power storage element is dominated by the positive electrode, a ratio of 4 or lower will allow sufficient energy capacity to be obtained.

<3. Power Storage Element>

The power storage element (lithium ion capacitor) of the invention includes the positive electrode and negative electrode formed in this manner, as well as an electrode laminate body having a separator laminated or rotary laminated thereon, a non-aqueous electrolyte, and an external body formed of a metal can or laminate film.

<3.1. Separator>

The separator used may be a polyethylene microporous film or polypropylene microporous film used in lithium ion secondary batteries, or a cellulose nonwoven sheet used in electric double layer capacitors.

The thickness of the separator is preferably between 10 μm and 50 μm, inclusive. If the thickness is 10 μm or greater, it will be possible to minimize self-discharge by internal microshorting, and if the thickness is not greater than 50 μm, the energy density and output characteristic of the power storage element will be excellent.

<3.2. Connection Between Electrode Terminals and Electrode Body>

The electrode laminate body comprises the positive electrode and negative electrode, and the separator, that have been laminated or rotary laminated. In such an electrode laminate body, one end of the positive electrode terminal is electrically connected to the positive electrode and one end of the negative electrode terminal is electrically connected to the negative electrode. Specifically, the positive electrode terminal is electrically connected to the region of the positive electrode current collector that is not coated with the positive electrode active material layer, while the negative electrode terminal is electrically connected to the region of the negative electrode current collector that is not coated with the negative electrode active material layer. Preferably, the material of the positive electrode terminal is aluminum, and the material of the negative electrode terminal is nickel-plated copper.

The electrode terminals (including the positive electrode terminal and negative electrode terminal) will usually each have an essentially rectangular shape. One end of the essentially rectangular shape is electrically connected to the current collector of the electrode, while the other end is electrically connected to an external load (for discharging) or power source (for charging) during use. In a preferred mode, a resin film such as polypropylene is attached at the center section of the electrode terminals, which is the sealed section of the laminate film external body, in order to prevent short circuiting between the electrode terminals and the metal foil composing the laminate film, and improve the closed sealing property.

The method of electrically connecting the electrode body and the electrode terminals will usually be an ultrasonic welding method, but it is not particularly restricted and may be, for example, a resistance welding or laser welding method.

<3.3. External Body>

The metal can used in the external body is preferably made of aluminum. The laminate film used in the external body is preferably a laminated film of a metal foil and a resin film, an example of which is a three-layer structure comprising the structure: outer layer resin film/metal foil/inner layer resin film. The outer layer resin film serves to prevent damage to the metal foil by contact. Examples of such outer layer resin films that may be suitably used include nylon and polyester resins. The metal foil serves to prevent permeation of moisture or gas. Examples of metal foils that may be suitably used include foils made of copper, aluminum and stainless steel. The inner layer resin film serves to protect the metal foil from the electrolyte housed inside while also providing a melt seal during heat sealing. For example, a polyolefin or acid-modified polyolefin may be suitably used.

<3.4. Non-Aqueous Electrolyte>

The non-aqueous electrolyte to be used in the power storage element of the invention may be a nonaqueous liquid including a lithium ion-containing electrolyte. Such a non-aqueous liquid may include an organic solvent. Examples of such organic solvents include cyclic carbonic acid esters representative of which are ethylene carbonate (EC) and propylene carbonate (PC), linear carbonic acid esters representative of which are diethyl carbonate (DEC), dimethyl carbonate (DMC) and ethylmethyl carbonate (MEC), and lactones such as γ-butyrolactone (yBL); as well as solvents comprising their mixtures.

Examples of salts that may be dissolved in these non-aqueous liquids include lithium salts such as $LiBF_4$ and $LiPF_6$. The salt concentration of the electrolyte is preferably in the range of 0.5 to 2.0 mol/L. If the salt concentration is 0.5 mol/L or greater, the anion will be sufficiently present in the electrolyte and the capacity of the power storage element will be maintained. If the salt concentration is 2.0 mol/L or less, the salt will sufficiently dissolve in the electrolyte and sufficient viscosity and conductivity will be maintained by the electrolyte.

<3.5. Assembly of Power Storage Element>

In the lithium ion capacitor of this embodiment, the positive electrode and negative electrode, as an electrode laminate body laminated or rotary laminated via a separator, are inserted in an external body formed from a metal can or laminate film.

One mode of the lithium ion capacitor of this embodiment is the mode shown in the cross-sectional schematic drawings of FIGS. 1(a) and (b), where the positive electrode terminal (1) and the negative electrode terminal (2) lead out from one side of the electrode laminate body (4). As a different mode, the positive electrode terminal (1) and negative electrode terminal (2) may lead out from two opposing sides of the electrode laminate body (4). In the latter mode, the electrode terminals can be widened for application to purposes with increased current flow.

The power storage element comprises positive electrodes, each comprising a positive electrode active material layer (6) laminated on a positive electrode current collector (5), and a negative electrode, comprising negative electrode active material layers (9) laminated on a negative electrode current collector (8), alternately laminated with the positive electrode active material layers (6) and negative electrode active material layers (9) facing each other sandwiching the separators (7), to form an electrode laminate body (4), the positive electrode terminal (1) being connected to the positive electrode current collector (5) and the negative electrode terminal (2) being connected to the negative electrode current collector (8), and the electrode laminate body (4) being housed in an external body (3), while a non-aqueous electrolyte (not shown) is injected into the external body (3), the peripheral sections of the external body (3) being sealed with the edges of the positive electrode terminal (1) and the negative electrode terminal (2) leading out of the external body (3).

<3.6. Working Voltage of Power Storage Element>

The power storage element of the invention is preferably operated between the maximum rated voltage and the minimum rated voltage. A higher maximum rated voltage corresponds to higher capacity in a range where overcharge does not occur, and is therefore set in a range of 3.8 to 4.0 V, for example. A lower minimum rated voltage corresponds to higher capacity in a range where overdischarge does not occur, and is therefore set in a range of 2.0 to 2.3 V, for example.

The power storage element immediately after assembly exhibits a voltage of about 3 V by pre-doping of lithium ion in the negative electrode, and is therefore preferably used after charging if necessary. The amount of change in the pre-doped lithium ion amount by doping and undoping by charge-discharge in a range of 2 to 4 V is about ±100 mAh/g per unit mass of the negative electrode active material. Thus, when the pre-doping amount of lithium ion per unit mass of the negative electrode active material is in the range of 1,050 to 2,500 mAh/g, the lithium ion doping total amount in the negative electrode active material after charge-discharge to a voltage in the range of 2 to 4 V is in the range of 950 to 2,600 mAh/g.

EXAMPLES

The invention will now be further explained through examples and comparative examples, with the understanding that these examples are not limitative on the invention in any way.

<Preparation of Composite Carbon Material>

Preparation Example 1

A kneaded mixture, obtained by kneading 100 parts by weight of carbon black (CB1) with a mean particle size of 30 nm and a BET specific surface area of 254 $m^2/g$ and 50 parts by weight of optically isotropic pitch (P1) with a softening point of 110° C. and a mesophase quantity (QI quantity) of 13%, with a heated kneader, was baked in a non-oxidizing atmosphere at 1,000° C. This was pulverized to a mean particle size (D50) of 2 µm to obtain composite carbon material 1. The mean particle size of the composite carbon material 1 was measured using an MT-3300EX by Nikkiso Co., Ltd.

The absorption isotherm of composite carbon material 1 with nitrogen as the adsorbate was measured using a pore distribution measuring apparatus (AUTOSORB-1 AS-1-MP) by Yuasa-Ionics, Inc., with nitrogen as the adsorbate. The BET specific surface area determined by the single point BET method was 110 $m^2/g$.

Preparation Examples 2 to 13

A composite carbon material was prepared in the same manner as Example 1, except that in the <Preparation of composite carbon material> of Preparation Example 1, the types and amounts of carbon black and pitch used, and the mean particle sizes after pulverizing, were as listed in Table 1.

TABLE 1

Preparation of composite carbon materials

| | | Starting material | | | | Mean particle size (D50) (µm) | BET specific surface area ($m^2/g$) |
|---|---|---|---|---|---|---|---|
| | | Carbon black | | Pitch | | | |
| | Name | Type | Amount (pts by wt) | Type | Amount (pts by wt) | | |
| Prep. Ex. 1 | Composite carbon material 1 | CB1 | 100 | P1 | 50 | 2 | 110 |
| Prep. Ex. 2 | Composite carbon material 2 | CB2 | 100 | P1 | 100 | 2 | 240 |
| Prep. Ex. 3 | Composite carbon material 3 | CB2 | 100 | P1 | 30 | 2 | 330 |
| Prep. Ex. 4 | Composite carbon material 4 | CB1 | 100 | P1 | 30 | 2 | 123 |
| Prep. Ex. 5 | Composite carbon material 5 | CB2 | 100 | P1 | 150 | 2 | 180 |
| Prep. Ex. 6 | Composite carbon material 6 | CB2 | 100 | P1 | 10 | 2 | 600 |
| Prep. Ex. 7 | Composite carbon material 7 | CB3 | 100 | P1 | 133 | 2 | 24 |
| Prep. Ex. 8 | Composite carbon material 8 | CB2 | 100 | P1 | 100 | 5 | 286 |
| Prep. Ex. 9 | Composite carbon material 9 | CB2 | 100 | P1 | 100 | 10 | 283 |
| Prep. Ex. 10 | Composite carbon material 10 | CB2 | 100 | P1 | 100 | 15 | 279 |
| Prep. Ex. 11 | Composite carbon material 11 | CB2 | 100 | P1 | 100 | 22 | 275 |
| Prep. Ex. 12 | Composite carbon material 12 | CB3 | 100 | P1 | 133 | 10 | 23 |
| Prep. Ex. 13 | Composite carbon material 13 | CB3 | 100 | P1 | 133 | 22 | 20 |

In Table 1, the abbreviations in the starting material column have the following meanings.

[Carbon Black]

CB1: Carbon black with mean particle size of 30 nm and BET specific surface area of 254 m$^2$/g CB2: Carbon black with mean particle size of 30 nm and BET specific surface area of 1,000 m$^2$/g CB3: Carbon black with mean particle size of 48 nm and BET specific surface area of 39 m$^2$/g

[Pitch]

P1: Optically isotropic pitch with softening point of 110° C. and mesophase quantity (QI) of 13%.

Example 1

<Fabrication of Negative Electrode>

A slurry with a solid concentration of 18 mass % was obtained by mixing 80.0 parts by mass of the composite carbon material 1 obtained in Preparation Example 1, 8.0 parts by mass of acetylene black, 3.0 parts by mass of CMC (carboxymethyl cellulose), 9.0 parts by mass of SBR latex, and distilled water. The obtained slurry was then coated and dried onto both sides of etching copper foil with a thickness of 15 μm, and pressed to obtain a negative electrode. The thickness per side of the negative electrode active material layers of the obtained negative electrode was 20 μm. The thickness of the negative electrode active material layer was determined as the value of subtracting the thickness of the copper foil from the average thickness of the negative electrode measured at 10 points of the negative electrode using a (Linear Gauge Sensor GS-551) by Ono Sokki Co., Ltd.

[Pre-Doping]

The obtained negative electrode was cut to 3 cm$^2$ to form a working electrode, and using metal lithium as both the counter electrode and reference electrode, and a solution of LiPF$_6$ at a concentration of 1 mol/L in a mixed solvent of ethylene carbonate and methylethyl carbonate in a mass ratio of 1:4 as the electrolyte, an electrochemical cell was fabricated in an argon dry box. For the electrochemical cell, a charge-discharge apparatus (TOSCAT-3100U) by Toyo System Co., Ltd. was used for constant-current charge at a current value of 85 mA/g per unit mass of the composite carbon material 1, to a potential of 1 mV with respect to the lithium potential, at an environmental temperature of 45° C. Next, constant-current/constant voltage charge was carried out with constant voltage charge at 1 mV, and charge was terminated when lithium ion was pre-doped to a total of 1,500 mAh/g per unit mass of the composite carbon material 1. The thickness of the negative electrode active material layer per side after pre-doping of lithium ion was 30 μm.

[Evaluation of Initial Charge Capacity]

For the electrochemical cell fabricated as described above, the initial charge capacity, at a measuring temperature of 25° C., when constant-current charge was conducted at a current value of 0.5 mA/cm$^2$ to a voltage value of 0.01 V, and followed by constant voltage charge to a current value of 0.01 mA/cm$^2$, was 730 mAh/g per unit mass of the composite carbon material 1.

<Fabrication of Positive Electrode>.

A crushed carbonized coconut shell product was subjected to carbonization in a small carbonizing furnace under a nitrogen atmosphere at 500° C. Water vapor was then introduced in place of nitrogen at 1 kg/h into the furnace in a state heated with a preheating furnace, and heated to 900° C. over a period of 8 hours for activation. The activated carbonized product was cooled under a nitrogen atmosphere to obtain activated active carbon. The obtained active carbon was flow-rinsed for 10 hours and then drained. After then drying for 10 hours in an electrodesiccator held at 115° C., pulverizing was carried out for 1 hour using a ball mill to obtain active carbon 1 as a positive electrode material.

The obtained active carbon 1 was measured for pore distribution using a pore distribution measuring apparatus (AUTOSORB-1 AS-1-MP) by Yuasa-Ionics, Inc., and as mentioned above, the isotherm at the desorption side was used to determine the mesopore volume by the BJH method and the micropore volume by the MP method. The mesopore volume (V$_1$) was 0.52 cc/g, the micropore volume (V$_2$) was 0.88 cc/g, V$_1$/V$_2$=0.59, and the mean pore size was 22.9 angstrom. The BET specific surface area determined by the single point BET method was 2,360 m$^2$/g.

The obtained active carbon 1 was used as a positive electrode active material to fabricate a positive electrode.

A slurry with a solid concentration of 14 mass % was obtained by mixing 83.4 parts by mass of the active carbon 1, 8.3 parts by mass of acetylene black, 8.3 parts by mass of PVDF (polyvinylidene fluoride) and NMP (N-methylpyrrolidone). The obtained slurry was coated onto one side of aluminum foil with a thickness of 15 μm, and dried and pressed to obtain a positive electrode. The thickness of the obtained positive electrode active material layer was 60 μm. The thickness of the positive electrode active material layer was determined as the value of subtracting the thickness of the aluminum foil from the average thickness measured at 10 points of the positive electrode using a (Linear Gauge Sensor GS-551) by Ono Sokki Co., Ltd.

<Assembly of Power Storage Element and Performance Evaluation>

The obtained positive electrode was cut out to 2 cm$^2$ and used as a positive electrode for a power storage element.

The positive electrode, and the negative electrode pre-doped with lithium ion, were placed facing each other sandwiching a cellulose paper separator with a thickness of 30 μm, and encapsulated in an external body composed of a laminate film using polypropylene and aluminum, and a power storage element (lithium ion capacitor) was assembled. As the electrolyte, there was used a solution of LiPF$_6$ at a concentration of 1 mol/L in a mixed solvent of ethylene carbonate and methylethyl carbonate in a mass ratio of 1:4.

[Measurement of Discharge Capacity, Output Characteristic and Internal Resistance (Time Constant)]

The discharge capacity, output characteristic and internal resistance (time constant) of the fabricated lithium ion capacitor were measured using a charge-discharge apparatus (ACD-01) by Aska Electronic Co., Ltd.

The lithium ion capacitor was subjected to constant-current charge to 4.0 V at a current of 1 mA at an environmental temperature of 25° C., followed by constant-current/constant-voltage charge with application of a constant voltage of 4.0 V, for 2 hours. It was then subjected to constant-current discharge to 2.0 V at a current of 1 mA.

The discharge capacity at 1 mA obtained at this time was used as the discharge capacity (mAh) at 1 C. The current (mA) at 1 C was defined by the following formula.

$$(\text{Current at 1C}) = (\text{discharge capacity at 1C})/t$$

The time t (h) for the formula was 1 h. The discharge capacity (mAh/cc) per unit volume of the negative electrode active material layer before pre-doping with lithium ion was determined by the following formula.

(Discharge capacity per unit volume of negative electrode active material layer before pre-doping with lithium ion)=(discharge capacity at 1C)/$V_{ano\_before}$ In the formula, $V_{ano\_before}$ is the volume (cc) of the negative electrode active material layer before lithium ion pre-doping. The discharge capacity (mAh/cc) per unit volume of the negative electrode active material layer after pre-doping with lithium ion was determined by the following formula.

(Discharge capacity per unit volume of negative electrode active material layer after pre-doping with lithium ion)=(discharge capacity at 1C)/$V_{ano\_after}$ In the formula, $V_{ano\_after}$ is the volume (cc) of the negative electrode active material layer after lithium ion pre-doping.

After then conducting charging in the same manner as above, the output characteristic (%) during constant-current discharge to 2.0 V at a current quantity of 300 C was determined by the following formula.

(Output characteristic)=(discharge capacity at 300C)/(discharge capacity at 1C)×100

Next, after constant-current charge at a current of 1 mA until reaching 3.8 V, constant-current/constant voltage charge with application of a constant voltage of 3.8 V was carried out for a total of 2 hours. This was followed by constant-current discharge to 2.2 V at a current quantity of 50 C.

In the obtained discharge curve (time-voltage), $E_0$ is the voltage at time=0 (s), obtained by extrapolation by linear approximation from the voltage values at discharge time 2 seconds and 4 seconds. The voltage value $E_0$ was used to determine the voltage drop ($\Delta E$)=3.8−E0, and the internal resistance ($\Omega$) was calculated from the relationship: internal resistance=$\Delta E$/(current quantity at 50 C). The time constant (ΩF) was determined by the following formula.

(Time constant)=(discharge capacity at 1C)×3.6/($V_{CG}-V_{DG}$)×(internal resistance)

In this formula, $V_{CG}$ (V) is the voltage (4 V) at terminal of charge, and $V_{EG}$ (V) is the voltage (2 V) at terminal of discharge.

The discharge capacity per unit volume of the negative electrode active material layer before lithium ion pre-doping of the lithium ion capacitor was 51.7 mAh/cc, the discharge capacity per unit volume of the negative electrode active material layer after lithium ion pre-doping was 34.5 mAh/cc, the output characteristic was 71% and the time constant was 1.17 ΩF.

Examples 2 to 9 and Comparative Examples 1 to 6

Negative electrodes were fabricated and evaluated in the same manner as Example 1, except that in <Fabrication of negative electrode> in Example 1, each of the composite carbon materials listed in Table 2 was used instead of composite carbon material 1 and the lithium ion pre-doping amounts and the thicknesses per side of the negative electrode active material layers before and after pre-doping of lithium ion were as listed in Table 2, and each negative electrode was used to fabricate a lithium ion capacitor which was subjected to the variety of evaluations as above.

In Comparative Examples 1, 3 and 6, some of the evaluations were not conducted, for the following reasons.

Comparative Example 1

Because the negative electrode active material layer of the obtained negative electrode was extremely brittle, evaluation of the negative electrode and fabrication and evaluation of the lithium ion capacitor were not carried out.

Comparative Example 3

During pre-doping of lithium ion, electrodeposition of Li was observed on the negative electrode, and therefore fabrication and evaluation of the lithium ion capacitor were not carried out.

Comparative Example 6 scratching was observed on the negative electrode surface, when coating was conducted in designing a thickness of 10 μm per side of the negative electrode active material layer after pressing, and therefore evaluation of the negative electrode and fabrication and evaluation of the lithium ion capacitor were not carried out.

The evaluation results are shown in Table 2.

TABLE 2

Evaluation results for power storage elements (1)

| | Negative electrode | | | | | Cell characteristics | | | |
| --- | --- | --- | --- | --- | --- | --- | --- | --- | --- |
| | | | | Active material layer thickness (μm) | | Discharge capacity of negative electrode active material layer per unit volume (mAh/cc) | | | |
| | | Initial | Li ion pre- | | | | | Output | Time |
| | Negative electrode active material | charge capacity (mAh/g) | doping amount (mAh/g) | Before pre-doping | After pre-doping | Before pre-doping | After pre-doping | characteristic (%) | constant (ΩF) |
| Example 1 | Composite carbon material 1 | 730 | 1500 | 20 | 30 | 51.7 | 34.5 | 71 | 1.17 |
| Example 2 | Composite carbon material 2 | 1100 | 1500 | 20 | 28 | 52.4 | 37.4 | 78 | 0.99 |
| Example 3 | Composite carbon material 3 | 1400 | 1500 | 20 | 27 | 50.8 | 37.6 | 71 | 1.21 |
| Example 4 | Composite carbon material 4 | 749 | 1500 | 20 | 30 | 52.7 | 35.1 | 77 | 1.00 |
| Example 5 | Composite carbon material 5 | 935 | 1500 | 20 | 30 | 52.2 | 34.8 | 80 | 0.97 |
| Example 6 | Composite carbon material 2 | 1100 | 1100 | 20 | 28 | 47.9 | 34.2 | 69 | 1.25 |
| Example 7 | Composite carbon material 2 | 1100 | 2200 | 20 | 33 | 49.8 | 30.2 | 75 | 1.11 |
| Example 8 | Composite carbon material 2 | 1100 | 1500 | 15 | 21 | 63.2 | 45.1 | 76 | 0.99 |

TABLE 2-continued

Evaluation results for power storage elements (1)

| | Negative electrode | | | | | Cell characteristics | | | |
|---|---|---|---|---|---|---|---|---|---|
| | | Initial charge capacity (mAh/g) | Li ion pre-doping amount (mAh/g) | Active material layer thickness (μm) | | Discharge capacity of negative electrode active material layer per unit volume (mAh/cc) | | Output charac-teristic (%) | Time constant (ΩF) |
| | Negative electrode active material | | | Before pre-doping | After pre-doping | Before pre-doping | After pre-doping | | |
| Example 9 | Composite carbon material 2 | 1100 | 1500 | 35 | 49 | 30.2 | 21.6 | 70 | 1.21 |
| Comp. Ex. 1 | Composite carbon material 6 | — | — | — | — | — | — | — | — |
| Comp. Ex. 2 | Composite carbon material 7 | 334 | 550 | 20 | 32 | 52.5 | 32.8 | 56 | 1.69 |
| Comp. Ex. 3 | Composite carbon material 3 | 1400 | 3000 Li electro-deposition | 20 | — | — | — | — | — |
| Comp. Ex. 4 | Composite carbon material 2 | 1100 | 550 | 20 | 23 | 28.7 | 25.0 | 55 | 1.78 |
| Comp. Ex. 5 | Composite carbon material 2 | 1100 | 1500 | 70 | 98 | 14.9 | 10.6 | 52 | 1.82 |
| Comp. Ex. 6 | Composite carbon material 2 | 1100 | — | <10 | — | — | — | — | — |

From the results in Table 2 it is seen that the power storage element of the invention has high energy density and can exhibit a high output characteristic.

Example 10

<Fabrication of Negative Electrode>

Negative electrodes were fabricated and evaluated in the same manner as Example 1, except that in <Fabrication of negative electrode> in Example 1, the composite carbon material 2 obtained in Preparation Example 2 was used instead of composite carbon material 1 and the lithium ion pre-doping amounts and the thicknesses per side of the negative electrode active material layers before and after pre-doping of lithium ion were as listed in Table 3.

[Measurement of Electrode Peel Strength]

The obtained negative electrode was used for an electrode peel strength test by the method described above. The measuring apparatus used was a single-column tension/compression tester (STB-1225S) by A&D Co., Ltd. The electrode peel strength of the negative electrode was 0.058 N/cm.

<Fabrication of Positive Electrode>

For the phenol resin, after carbonization for 2 hours in a baking furnace at 600° C. under a nitrogen atmosphere, it was pulverized with a ball mill and sorted, to obtain a carbide having a mean particle size of 7 μm. The carbide and KOH were mixed at a mass ratio of 1:4.3, and heated for 1 hour in a baking furnace at 800° C. under a nitrogen atmosphere, for activation. The mixture was subsequently stirred and rinsed for 1 hour in dilute hydrochloric acid adjusted to a concentration of 2 mol/L, and then boiled and rinsed with distilled water until the pH stabilized to between 5 and 6. This was subsequently dried to prepare active carbon 2.

The obtained active carbon 2 was measured for pore distribution using a pore distribution measuring apparatus (AUTOSORB-1 AS-1-MP) by Yuasa-Ionics, Inc., and as mentioned above, the isotherm at the desorption side was used to determine the mesopore volume by the BJH method and the micropore volume by the MP method. As a result, the mesopore volume ($V_1$) was 1.33 cc/g, the micropore volume ($V_2$) was 1.88 cc/g, and $V_1/V_2=0.71$. The BET specific surface area determined by the single point BET method was 3,120 m²/g.

Using the obtained active carbon 2 as the positive electrode active material, a slurry with a solid concentration of 14 mass % was obtained by mixing 83.4 parts by mass of the active carbon 2, 8.3 parts by mass of Ketjen black, 8.3 parts by mass of PVDF (polyvinylidene fluoride) and NMP (N-methylpyrrolidone). The obtained slurry was coated onto one side of aluminum foil with a thickness of 15 μm, and dried and pressed to obtain a positive electrode. The thickness of the positive electrode active material layer in the obtained positive electrode was 56 μm. The thickness of the positive electrode active material layer is the value of subtracting the thickness of the aluminum foil from the average thickness measured at 10 arbitrary points of the positive electrode using a (Linear Gauge Sensor GS-551) by Ono Sokki Co., Ltd.

<Assembly of Power Storage Element and Performance Evaluation>

A power storage element (lithium ion capacitor) was fabricated in the same manner as Example 1, except for using the obtained negative electrode and positive electrode, and the variety of evaluations as above were conducted.

[High-Rate Cycle Durability Test]

In addition to the aforementioned evaluation, the high-rate cycle capacity retention of the fabricated lithium ion capacitor was also measured using a charge-discharge apparatus (ACD-01) by Aska Electronic Co., Ltd.

The lithium ion capacitor was subjected to constant-current charge to 4.0 V at a current quantity of 300 C and then constant-current discharge to 2.0 V at a current quantity of 300 C, at an environmental temperature of 25° C. This charge-discharge cycle was repeated for 60,000 cycles. The high-rate cycle capacity retention (%) was determined by the following formula.

(High-rate cycle capacity retention)=(discharge capacity at 300C in 60,000th cycle)/(discharge capacity at 300C in 1st cycle)×100

The high-rate cycle capacity retention of the lithium ion capacitor was 83%.

The evaluation results are shown in Tables 3 and 4.

Examples 11 to 14 and Comparative Examples 7 to 9

Negative electrodes were fabricated and evaluated in the same manner as Example 10, except that in <Fabrication of negative electrode> in Example 10, each of the composite carbon materials listed in Table 3 was used instead of composite carbon material 2 and the lithium ion pre-doping amounts and the thicknesses per side of the negative electrode active material layers before and after pre-doping of lithium ion were as listed in Table 3, and each negative electrode was used to fabricate a lithium ion capacitor which was subjected to the variety of evaluations as above.

The evaluation results are shown in Tables 3 and 4.

Comparative Example 10

<Fabrication of Negative Electrode>

A kneaded mixture, obtained by kneading 100 parts by weight of non-graphitizable carbon and 50 parts by weight of optically isotropic pitch with a softening point of 110° C. and a mesophase quantity (QI quantity) of 13%, with a heated kneader, was baked in a non-oxidizing atmosphere at 1,000° C. This was pulverized to a mean particle size of 2 μm to obtain a composite non-graphitizable carbon material having a BET specific surface area of 211 m²/g.

Negative electrodes were fabricated and evaluated in the same manner as Example 10, except that in <Fabrication of negative electrode> in Example 10, the composite non-graphitizable carbon material was used instead of composite carbon material 2, and the lithium ion pre-doping amounts and the thicknesses per side of the negative electrode active material layers before and after pre-doping of lithium ion were as listed in Table 3, and each negative electrode was used to fabricate a lithium ion capacitor which was subjected to the variety of evaluations as above.

The evaluation results are shown in Tables 3 and 4.

TABLE 3

Evaluation results for power storage elements (2)

| | Negative electrode | | | | | |
|---|---|---|---|---|---|---|
| | | | | Active material layer thickness (μm) | | Electrode |
| | Negative electrode active material | Initial charge capacity (mAh/g) | Li ion pre-doping amount (mAh/g) | Before pre-doping | After pre-doping | peel strength (N/cm) |
| Example 10 | Composite carbon material 2 | 1100 | 1500 | 20 | 28 | 0.058 |
| Example 11 | Composite carbon material 8 | 1309 | 1500 | 20 | 28 | 0.252 |
| Example 12 | Composite carbon material 9 | 1298 | 1500 | 20 | 27 | 0.361 |
| Example 13 | Composite carbon material 10 | 1271 | 1500 | 20 | 28 | 0.390 |
| Example 14 | Composite carbon material 11 | 1259 | 1500 | 20 | 28 | 0.325 |
| Comp. Ex. 7 | Composite carbon material 7 | 334 | 550 | 20 | 32 | 0.303 |
| Comp. Ex. 8 | Composite carbon material 12 | 329 | 550 | 20 | 32 | 0.332 |
| Comp. Ex. 9 | Composite carbon material 13 | 325 | 550 | 20 | 32 | 0.319 |

TABLE 3-continued

Evaluation results for power storage elements (2)

| | Negative electrode | | | | | |
|---|---|---|---|---|---|---|
| | | | | Active material layer thickness (μm) | | Electrode |
| | Negative electrode active material | Initial charge capacity (mAh/g) | Li ion pre-doping amount (mAh/g) | Before pre-doping | After pre-doping | peel strength (N/cm) |
| Comp. Ex. 10 | Composite non-graphitizable carbon material | 489 | 630 | 20 | 32 | 0.520 |

TABLE 4

Evaluation results for power storage elements (3)

| | Cell characteristics | | | | |
|---|---|---|---|---|---|
| | Discharge capacity of negative electrode active material layer per unit volume (mAh/cc) | | Output characteristic (%) | Time constant (ΩF) | High-rate cycle capacity retention (%) |
| | Before pre-doping | After pre-doping | | | |
| Example 10 | 54.1 | 38.6 | 82 | 1.00 | 83 |
| Example 11 | 54.0 | 38.6 | 83 | 0.99 | 85 |
| Example 12 | 54.3 | 40.2 | 86 | 0.97 | 93 |
| Example 13 | 54.3 | 38.8 | 84 | 1.01 | 92 |
| Example 14 | 53.7 | 38.4 | 80 | 1.05 | 87 |
| Comp. Ex. 7 | 53.9 | 33.7 | 60 | 1.65 | 80 |
| Comp. Ex. 8 | 54.1 | 33.8 | 62 | 1.63 | 81 |
| Comp. Ex. 9 | 53.5 | 33.4 | 60 | 1.70 | 78 |
| Comp. Ex. 10 | 54.2 | 33.9 | 39 | 2.05 | 39 |

The results in Tables 3 and 4 demonstrate that when the BET specific surface area is very large at 100 m²/g or greater in a composite carbon material containing carbon black and a carbonaceous material, as a negative electrode active material according to the invention, the electrode peel strength of the negative electrode can be greatly improved by increasing the mean particle size (D50) of the composite carbon material to 5 μm or greater. This suggests that the high-rate cycle durability would also be improved. On the other hand, when the BET specific surface area of the composite carbon material is smaller than 100 m²/g, the electrode peel strength of the negative electrode is sufficiently high regardless of the magnitude of the mean particle size (D50) of the composite carbon material.

Lithium ion capacitors produced using these composite carbon materials all exhibited sufficiently high output characteristics, energy density and high-rate cycle durability.

On the other hand, with a composite non-graphitizable carbon material, using a non-graphitizable carbon material instead of carbon black, it is possible to obtain sufficient electrode peel strength even with a very large BET specific surface area of 100 m²/g or greater. However, with a lithium ion capacitor using a composite non-graphitizable carbon material as the negative electrode active material, it is not possible to obtain sufficiently high output characteristics, energy density and high-rate cycle durability. The reason for the low high-rate cycle durability despite sufficiently high electrode peel strength in a composite non-graphitizable carbon material is conjectured to be low coulombic efficiency for charge-discharge.

INDUSTRIAL APPLICABILITY

The power storage element of the invention may be suitably used, for example, in the field of hybrid drive systems that combine automobile internal combustion engines, fuel cells or motors with power storage elements for automobiles, and in assist applications for instantaneous electric power peaks.

EXPLANATION OF SYMBOLS

1 Positive electrode terminal
2 Negative electrode terminal
3 External body
4 Electrode laminate body
5 Positive electrode current collector
6 Positive electrode active material layer
7 Separator
8 Negative electrode current collector
9 Negative electrode active material layer
10 Negative electrode current collector
11 Negative electrode active material layer
12 Cellophane tape
13 Non-bonded section

What is claimed is:

1. A lithium ion capacitor comprising:
an electrode laminate body comprising a positive electrode, a negative electrode and a separator;
a non-aqueous electrolyte solution including a lithium ion-containing electrolyte; and
an external body,
wherein the electrode laminate body and the non-aqueous electrolyte solution are housed in the external body,
wherein the negative electrode comprises:
a negative electrode current collector; and
a negative electrode active material layer that includes a negative electrode active material that occlude and release lithium ions, on one or both sides of the negative electrode current collector,
the negative electrode active material is a composite carbon material having a mean particle size (D50) between 5 μm and 20 μm, inclusive, and comprising carbon black and a carbonaceous material,
(ii) the negative electrode is doped with lithium ion at between 1,050 mAh/g and 2,500 mAh/g, inclusive, per unit mass of the negative electrode active material, and
(iii) the thickness of the negative electrode active material layer is between 10 μm and 60 μm, inclusive, per side.

2. The lithium ion capacitor according to claim 1, wherein the thickness of the negative electrode active material layer is between 10 μm and 40 μm, inclusive, per side.

3. The lithium ion capacitor according to claim 1, wherein the electrode peel strength of the negative electrode is 0.20 N/cm or greater.

4. The lithium ion capacitor according to claim 1, wherein the specific surface area of the composite carbon material as calculated by the BET method is between 100 $m^2/g$ and 350 $m^2/g$, inclusive.

5. The lithium ion capacitor according to claim 1, wherein the negative electrode has an initial charge capacity of between 700 mAh/g and 1,600 mAh/g, inclusive, per unit mass of the negative electrode active material, when lithium metal is used as the counter electrode to form a lithium ion capacitor, and when constant-current charge has been conducted with a current value of 0.5 $mA/cm^2$ to a voltage value of 0.01 V, and then constant voltage charge is conducted until the current value reaches 0.01 $mA/cm^2$, at a measuring temperature of 25° C.

6. The lithium ion capacitor according to claim 1, wherein the composite carbon material is produced by baking or graphitizing a kneaded mixture of 100 parts by mass of carbon black and between 30 parts by mass and 200 parts by mass, inclusive of a precursor of the carbonaceous material.

7. The lithium ion capacitor according to claim 1, wherein the composite carbon material is produced by:
baking or graphitizing a kneaded mixture at 800° C. to 3,200° C., wherein the kneaded mixture is obtained by kneading:
the carbon black having a mean particle size of 12 to 300 nm as observed under an electron microscope, and a specific surface area of 200 to 1,500 $m^2/g$ as determined by the BET method, and
a precursor of the carbonaceous material; and
pulverizing baked or graphitized the mixture to a mean particle size (D50) of 1 to 20 μm.

8. The lithium ion capacitor according to claim 1, wherein the positive electrode has:
a positive electrode current collector; and a positive electrode active material layer including a positive electrode active material on one or both sides of the positive electrode current collector, and
wherein the positive electrode active material is active carbon satisfying the inequalities $0.3<V1\leq0.8$ and $0.5\leq V2\leq1.0$, where V1 (cc/g) is the mesopore volume due to pores with diameters of between 20 angstrom and 500 angstrom, inclusive, as calculated by the BJH method, and V2 (cc/g) is the micropore volume due to pores with diameters of smaller than 20 angstrom as calculated by the MP method, and having a specific surface area of between 1,500 $m^2/g$ and 3,000 $m^2/g$, inclusive, as measured by the BET method.

9. The lithium ion capacitor according to claim 1, wherein the positive electrode has:
a positive electrode current collector; and a positive electrode active material layer including a positive electrode active material on one or both sides of the positive electrode current collector, and
wherein the positive electrode active material is active carbon satisfying the inequalities $0.8<V1\leq2.5$ and $0.8<V2\leq3.0$, where V1 (cc/g) is the mesopore volume due to pores with diameters of between 20 angstrom and 500 angstrom, inclusive, as calculated by the BJH method, and V2 (cc/g) is the micropore volume due to pores with diameters of smaller than 20 angstrom as calculated by the MP method, and having a specific surface area of between 3,000 $m^2/g$ and 4,000 $m^2/g$, inclusive, as measured by the BET method.

10. The lithium ion capacitor according to claim 2, wherein the electrode peel strength of the negative electrode is 0.20 N/cm or greater.

11. The lithium ion capacitor according to claim 2, wherein the specific surface area of the composite carbon material as calculated by the BET method is between 100 $m^2/g$ and 350 $m^2/g$, inclusive.

12. The lithium ion capacitor according to claim 6, wherein the specific surface area of the composite carbon material as calculated by the BET method is between 100 m2/g and 350 m2/g, inclusive.

13. The lithium ion capacitor according to claim 2, wherein the negative electrode has an initial charge capacity of between 700 mAh/g and 1,600 mAh/g, inclusive, per unit mass of the negative electrode active material, when lithium metal is used as the counter electrode to form a lithium ion capacitor, and when constant-current charge has been conducted with a current value of 0.5 mA/cm$^2$ to a voltage value of 0.01 V, and then constant voltage charge is conducted until the current value reaches 0.01 mA/cm$^2$, at a measuring temperature of 25° C.

14. The lithium ion capacitor according to claim 3, wherein the negative electrode has an initial charge capacity of between 700 mAh/g and 1,600 mAh/g, inclusive, per unit mass of the negative electrode active material, when lithium metal is used as the counter electrode to form a lithium ion capacitor, and when constant-current charge has been conducted with a current value of 0.5 mA/cm$^2$ to a voltage value of 0.01 V, and then constant voltage charge is conducted until the current value reaches 0.01 mA/cm$^2$, at a measuring temperature of 25° C.

15. The lithium ion capacitor according to claim 6, wherein the negative electrode has an initial charge capacity of between 700 mAh/g and 1,600 mAh/g, inclusive, per unit mass of the negative electrode active material, when lithium metal is used as the counter electrode to form a lithium ion capacitor, and when constant-current charge has been conducted with a current value of 0.5 mA/cm2 to a voltage value of 0.01 V, and then constant voltage charge is conducted until the current value reaches 0.01 mA/cm2, at a measuring temperature of 25° C.

16. The lithium ion capacitor according to claim 4, wherein the negative electrode has an initial charge capacity of between 700 mAh/g and 1,600 mAh/g, inclusive, per unit mass of the negative electrode active material, when lithium metal is used as the counter electrode to form a lithium ion capacitor, and when constant-current charge has been conducted with a current value of 0.5 mA/cm$^2$ to a voltage value of 0.01 V, and then constant voltage charge is conducted until the current value reaches 0.01 mA/cm$^2$, at a measuring temperature of 25° C.

* * * * *